United States Patent [19]
Sullivan et al.

[11] Patent Number: 5,618,080
[45] Date of Patent: Apr. 8, 1997

[54] UPPER TRACK ROLLER MECHANISM FOR SLIDING DOOR

[75] Inventors: Brian K. Sullivan, Livonia; Graham J. Britain, Canton; Donald F. Nelson, Dearborn, all of Mich.

[73] Assignee: Ford Motor Company, Dearborn, Mich.

[21] Appl. No.: 541,862

[22] Filed: Oct. 10, 1995

Related U.S. Application Data

[63] Continuation of Ser. No. 173,024, Dec. 27, 1993, abandoned.

[51] Int. Cl.⁶ .......................................................... B60J 5/06
[52] U.S. Cl. ................................................. 296/155; 49/213
[58] Field of Search ............................... 296/146.1, 155; 49/209, 213–215, 409–413

[56] References Cited

U.S. PATENT DOCUMENTS

| | | | |
|---|---|---|---|
| 2,900,207 | 8/1959 | May | 49/213 X |
| 2,957,725 | 10/1960 | Ford, II et al. | 49/214 X |
| 3,312,015 | 4/1967 | Plegat | 49/213 |
| 4,544,198 | 10/1985 | Ochiai et al. | 296/155 |
| 4,560,197 | 12/1985 | Minami | 296/155 |
| 4,569,553 | 2/1986 | Speth et al. | |
| 4,608,777 | 9/1986 | Okamoto | 49/214 |
| 4,991,905 | 2/1991 | Watanabe et al. | 296/155 |

FOREIGN PATENT DOCUMENTS 602405  7/1978  Switzerland ............................ 296/155

*Primary Examiner*—Dean Kramer
*Attorney, Agent, or Firm*—Daniel M. Stock

[57] ABSTRACT

A upper track roller mechanism for an automotive vehicle sliding door is provided in which the upper track is formed as a generally U-shaped track member having centering mechanisms associated with it for preventing vertical movement of the roller into rubbing contact with upper or lower portions of the track. The centering mechanisms may include one or more chamfers formed on the outer wall of the track and a washer carried adjacent the roller in juxtaposition with the portion of the track.

7 Claims, 1 Drawing Sheet

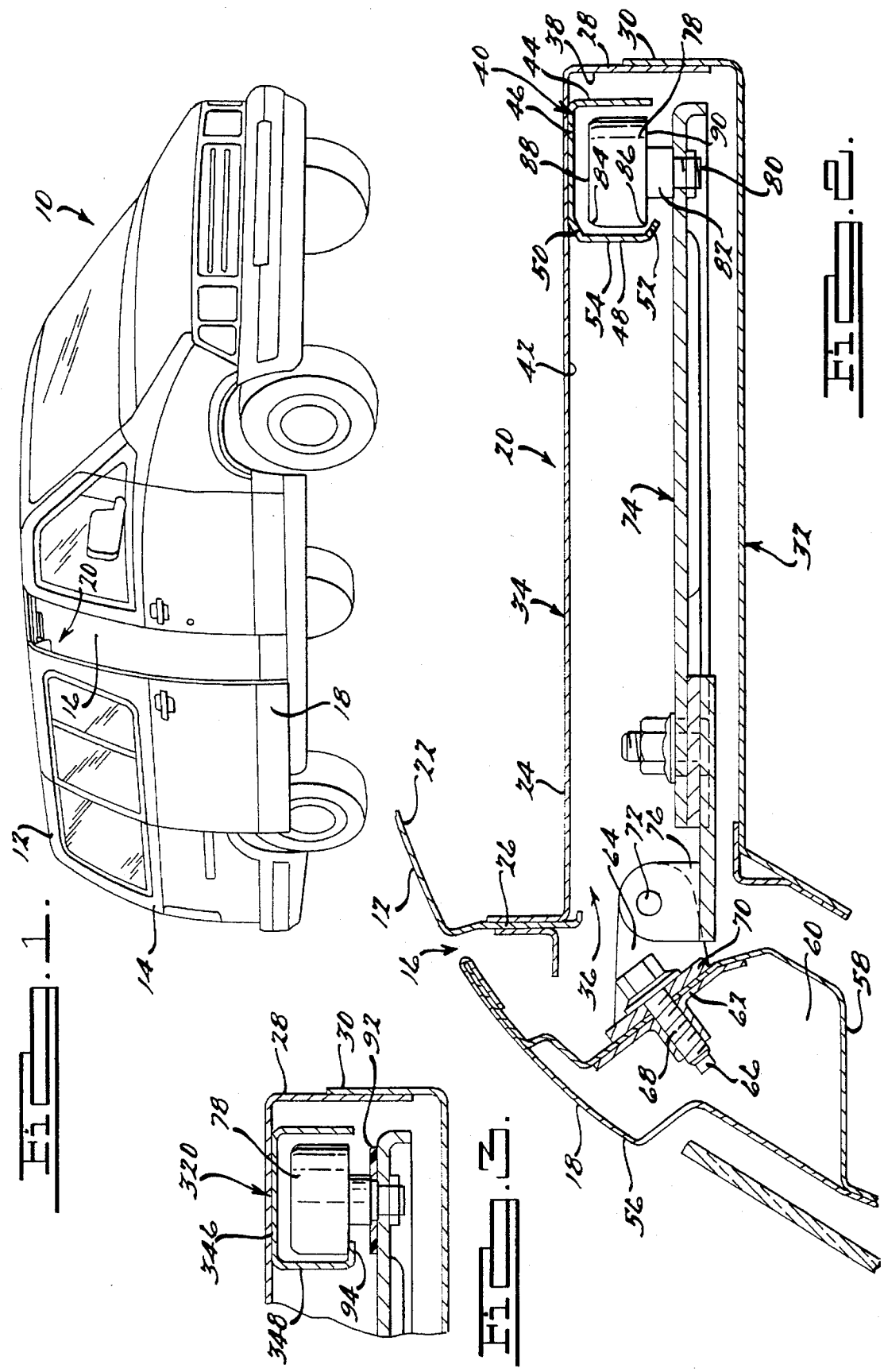

5,618,080

UPPER TRACK ROLLER MECHANISM FOR SLIDING DOOR

This is a continuation of application Ser. No. 08/173,024 filed Dec. 27, 1993 now abandoned.

BACKGROUND OF THE INVENTION

1. Technical Field

The present invention relates generally to sliding door mechanisms for automobiles, and more specifically to upper track roller mechanisms for such doors.

2. Description of the Prior Art

In the fabrication of certain types of automotive vehicles, such as passenger vans, it is known to provide access to rear portions of the vehicle interior compartment by use of a sliding door mechanism. In the typical sliding door mechanism, the door, in its closed position, is flush with the side of the vehicle in a latched position. Moving from the latch position, the door is moved outward with respect to the side of the vehicle and then slid rearwardly to an open position. The outward and rearward motion of the sliding door is controlled by roller mechanisms engaged between the door and the vehicle body at vertically spaced surface of the door. In some vehicles, an upper track roller mechanism is provided at top of the door aperture, which employs a curved track mechanism which receives a roller rotatable about a vertical axis. The roller is typically mounted on a linkage which is pivotally connected to the door. U.S. Pat. No. 4,569,553 is exemplary of such a design.

Because of dimensional variances in building a high volume of such vehicles, controlling the vertical position of the track roller during its full range of movement in operation of the door is very difficult to accomplish. It is of course desirable that the roller not rubbingly engage either the top nor bottom surface of the track. Such contact causes undesirable wear and noise in the operation of the sliding door. To control such vertical excursions, the mechanism disclosed in U.S. Pat. No. '553 provides a guide lip on the track and a pair of fingers adjacent the roller to limit vertical movement. While effective for its purpose, this design necessitates the use of auxiliary structure which is considered uneconomical to manufacture in some applications. It also suffers from the disadvantage of providing the vertical guide structure which employs a guide lip at a position depending below the track structure defined by the primary function of the track roller, that is, a roller and track structure of increased height is employed in order to effect the vertical guiding function.

SUMMARY OF THE INVENTION

Responsive to the deficiencies in the prior art, it is an object of the present invention to provide an upper track roller mechanism for an automotive vehicle sliding door which provides limitation in vertical positioning of a roller with respect to an upper roller track in a vertically compact manner that is economical to produce.

This object is met through providing an upper track roller mechanism that includes a generally U-shaped track member for receiving a roller carried on the end of the linkage pivotally mounted to the door in which the track mechanism includes one vertical wall positioned, laterally outwardly with respect to the vehicle upon which there are formed upper and lower chamfers for self-centering the roller with respect to the track when the door is shifted outwardly toward its opening position.

According to an alternative aspect of the present invention, at least a single lower chamfer is provided on the laterally outer wall of the track.

According to yet another aspect of the present invention, an upper track roller mechanism is provided in which upward vertical positioning of the roller with respect to the track is limited by the provision of a washer interposed between the roller and the track outer wall.

BRIEF DESCRIPTION OF THE DRAWINGS

These and other objects and features of the present invention will be apparent to those skilled in the automotive body arts upon reading the following description with reference to the accompanying drawing, in which:

FIG. 1 is a perspective view of an automotive vehicle employing a sliding door with the door in a partially open position;

FIG. 2 is a vertical cross sectional view through an upper part of the door and roof of the vehicle of FIG. 1 showing the improved upper track roller mechanism of the present invention; and FIG. 3 is a cross sectional view of a roller and track interface illustrating an alternative embodiment of the present invention.

DESCRIPTION OF THE PREFERRED EMBODIMENTS

Turning now to drawings, and in particular to FIG. 1 thereof, an automotive vehicle 10, a minivan, is illustrated as including a body 12 having a body side wall 14 traversed by a door aperture 16. The door aperture 16 is closed by a sliding door assembly 18 whose motion is controlled in part by an upper track roller assembly indicated generally at 20.

Turning next to FIG. 2, the body 12 is illustrated as including a roof panel 22. A first inner panel 24 is secured to a vertically extending portion 26 of the roof panel 22, preferably by welding. The inner panel 24 includes a vertically downwardly extending portion 28 secured by welding or the like to a vertical portion 30 of a second inner panel 32. The joining of the inner panels 24, 32 in the spaced relationship shown in FIG. 2 defines a hardware can 34 for receiving portions of the upper track roller mechanism 20. The can 34 includes an opening 36 communicating through the door aperture 16 and a closed inner end 38. A generally U-shaped track mechanism 40 is secured to a lower surface 42 of the inner panel 24, preferably by welding adjacent the inner end 38. The track 40 includes a generally straight, vertical inner wall 44, an upper base wall 46 projecting perpendicularly outwardly from the inner wall 44, and a depending outer wall 48 extending vertically downwardly from the wall 46. An upper chamfer 50 and a lower chamfer 52 are formed on the upper and lower ends of the inner surface 54 of the wall 48.

The door 18 preferably includes an outer panel 56 and an inner panel 58 secured to the outer panel 56 in a known manner to define the structural box section 60 adjacent the top of the door 18. A weld nut 62 is preferably positioned within the box section 60 and a pivot mount 64 is positioned in registration with weld nut 62 so that a threaded fastener, such as a bolt 66, may be inserted through a clearance hole 68 in a mounting flange 70 of the pivot mount 64. The pivot mount 64 carries a journal member, such as a pin 72, to which is pivotally mounted a roller link assembly 74. The roller link assembly 74 includes an upstanding ear 76 pivotally mounted on the pin 72 at one end, and at the other end includes a roller 78 mounted for rotation about a generally vertical axis in a known manner. The roller 78 is fixed as by a threaded fastener, indicated generally at 80, to an arm assembly 82 extending from the outward end of the link assembly to the inner end. It will be understood that as the door 18 is opened with respect to the vehicle side wall that it first moves laterally outwardly with respect to the wall 14 as controlled by a pivotally mounted arm (not shown) near its bottom. As it does so, the roller 78 will tend to move laterally outwardly as well. Upper and lower corners 84, 86 of the roller 78 may engage upper and lower chamfers 50, 52 if the vertical position of the roller 78 with respect to the track 40 is not vertically central within prescribed limits. Lateral outward movement engaging either of the chamfers will tend to force the roller 78 toward the vertical center of the track 40, preventing contact between the upper surface 88 or lower surface 90 of the roller 78 and facing surfaces of the track 40.

An additional advantage for providing the lower chamfer 52 beyond the centering function described derives from the fact that during assembly of an automotive vehicle of the type shown, painting is effected through dipping the body in paint. The sloping lower chamfer ensures against puddling and dripping of the paint during such process.

Turning lastly to FIG. 3, an alternative embodiment of the present invention is shown in which like numbers preceded by the numeral 3 are used to designate like parts. The outer wall 348 is illustrated as not including upper and lower chamfers. A washer 92, which may be fabricated from nylon is added in surrounding relationship with respect to a shaft portion 94 of the roller 78 so that upward movement of the roller 78 into contact with the base wall 346 of the upper track roller assembly 320 is prevented by abutting contact between the washer 92 and inturned lower edge 94 of the outer wall 348. In this embodiment, undesirable wear of the roller 78 is prevented at its upper surfaces for applications in which the lower extreme position of the roller 78 can be controlled by other means. This may provide an economical option.

It can also be appreciated that a further alternative might be provided in which the FIG. 3 embodiment includes only a lower chamfer on its outer wall 348.

While only certain embodiments of the upper track roller mechanism of the present invention have been disclosed, others may occur to those skilled in the automotive vehicle body arts which do not depart-from the scope of the appended claims.

What is claimed is:

1. An upper track roller mechanism for an automotive vehicle having a door slidingly movable between open and closed positions with respect to a door aperture in the vehicle body, the mechanism comprising:

a generally U-shaped track member mounted on an upper edge of the door aperture and having a pair of laterally spaced inner and outer vertical side walls joined by an upper base wall;

an elongated guide link having one end mounted to the door for pivotal movement with respect thereto about a longitudinal horizontal axis;

a generally cylindrical roller assembly mounted at the other end of the guide link for rotation about a generally vertical axis perpendicular to the guide link, the roller having an upper corner that terminates at the uppermost end of the roller and a lower corner that terminates at the lowermost end of the roller wherein the roller is received within the track member; and means formed on the track member outer wall and engageable with at least one of the roller upper and lower corners for vertically centering the roller assembly within the track member.

2. An upper track roller mechanism as defined in claim 1 wherein the means for vertically centering is integrally formed with the track member outer wall.

3. An upper track roller mechanism as defined in claim 2 wherein the means for vertically centering comprises a pair of chamfers formed on the upper and lower ends of the outer wall of the track member.

4. An upper track roller mechanism as defined in claim 1 wherein the means for vertically centering comprises a pair of chamfers formed on the upper and lower ends of the outer wall of the track member.

5. An upper track roller mechanism as defined in claim 1 wherein the means for vertically centering comprises at least one chamfer formed in the outer wall of the track member.

6. An upper track roller mechanism as defined in claim 1, wherein the vehicle body includes a roof panel adjacent the door aperture and further comprises a can fixedly secured to the roof panel for receiving the elongated guide link therein.

7. An upper track roller mechanism as defined in claim 6 wherein the track member is fixedly secured within the can.

* * * * *